United States Patent

Yamada

Patent Number: 5,390,699
Date of Patent: Feb. 21, 1995

[54] REED VALVE ASSEMBLY

[75] Inventor: Toshiyuki Yamada, Shizuoka, Japan

[73] Assignee: Suzuki Kabushiki Kaisha, Shizuoka, Japan

[21] Appl. No.: 994,089

[22] Filed: Dec. 17, 1992

Related U.S. Application Data

[63] Continuation of Ser. No. 757,267, Sep. 10, 1991, abandoned.

[30] Foreign Application Priority Data

Sep. 12, 1990 [JP] Japan ................. 2-240001

[51] Int. Cl.⁶ ............................................. F16K 15/16
[52] U.S. Cl. ................ 137/512.15; 123/73 V; 137/856
[58] Field of Search ............... 123/73 V; 137/512.12, 137/856

[56] References Cited

U.S. PATENT DOCUMENTS 1,499,599  7/1924  Seppeler et al. ............. 123/73 V X
4,643,139  2/1987  Hargreaves ................. 123/73 V X
4,879,976  11/1989  Boyesen ..................... 123/73 V X Primary Examiner—Gerald A. Michalsky
Attorney, Agent, or Firm—Finnegan, Henderson, Farabow, Garrett & Dunner

[57] ABSTRACT

A reed valve assembly is mounted in a valve chamber formed in an intake passage of a crankcase of a two-stroke cycle engine and the reed valve assembly comprises a box-shaped valve body having a base end opened and secured to an intake pipe and a front end converging towards the crankcase, the valve body being provided with valve openings formed to side surfaces of the valve body, and reed valves resiliently provided for the valve openings. The valve chamber has opposing inner wall surfaces gently curved outwardly for forming expanded portions between the side surfaces of the valve body and the expanded surfaces of the valve chamber. The curved surfaces of the inner wall surfaces of the valve body converge towards an interior of the crankcase with an inclination of about 10 to 20 degrees and a maximum lateral width of each of the expanded portions is defined to about 5 to 10 mm.

4 Claims, 2 Drawing Sheets

REED VALVE ASSEMBLY

This application is a continuation, of application Ser. No. 07/757,267, filed Sep. 10, 1991, now abandoned.

BACKGROUND OF THE INVENTION

The present invention relates to a reed valve assembly of a two-stroke cycle engine which is installed in an intake passage of the engine to control admitance and shuttering for an intake air.

In the known art, there is provided a two-stroke cycle engine in which a fuel gas is taken into a crankcase of the engine and which employs a reed valve assembly for controlling admitance and shuttering for the fuel gas. In this meaning, it may be said that the reed valve assembly is one kind of check valve.

In a typical arrangement of the reed valve assembly, a valve chamber is formed in one portion of the crankcase and a carburetor is connected to the external end thereof. That is, the fuel gas is sucked into the crankcase through the valve chamber, in which a reed valve assembly is accommodated.

The reed valve assembly comprises a box-shaped valve body which has an opened base end portion and upper and lower surfaces provided with valve openings and converging towards the leading end thereof and a reed valve resiliently kept in contact with the valve openings of the upper and lower surfaces. The reed valve has the leading end as a free end and is fixedly secured at its base end portion to the valve body. Additionally, the reed valve assembly is so attached to the interior of the valve chamber as for the leading end portion to face the interior of the crankcase and as to close the inlet port means of a flange provided at the base end portion.

The fuel gas is adapted to be so intaken as to pass through the interior of the valve body from the intake passage and to push and open the reed valve by means of a negative pressure produced within the crankcase during the intake stroke of the engine. When a positive pressure is recovered within the crankcase, the reed valve soon closes the valve inlet port and prevent a reverse flow of the fuel gas. In that way, the reed valve assembly serves as a kind of check valve to control the opening and closing of the intake passage.

Incidentally, when observing the inflow state of the fuel gas in the reed valve assembly, one portion of the fuel gas is going to .flow out laterally from the side edges of the valve openings while most of the fuel gas flows out from the leading end portions of the reed valve. This portion is however prevented from smoothly flowing out because the side walls of the valve chamber are opposed thereto through a little clearance. Accordingly, this results in a lowering of an intake efficiency of the whole of the reed valve assembly.

SUMMARY OF THE INVENTION

An object of the present invention is to substantially eliminate defects or drawbacks encountered in the prior art and to provide a reed valve assembly of a two-stroke cycle engine capable of enhancing an intake efficiency by increasing an amount of the fuel gas flowing out from the opposite sides of the reed valves and hence improving an engine performance throughout the whole revolution range of the two-stroke cycle engine.

This and other objects can be achieved according to the present invention by providing a reed valve assembly mounted in a valve chamber formed in an intake passage communicated with a crankcase of a two-stroke cycle engine, the reed valve assembly comprising a box-shaped valve body having a base end opened and secured to an intake pipe and a front end converging towards the crankcase, the valve body being provided with valve openings formed to side surfaces of the valve body, and reed valves resiliently provided for the valve openings. The valve chamber having opposing inner wall surfaces gently curved outwardly for forming expanded portions between the side surfaces of the valve body and the expanded surfaces of the valve chamber. The curved surfaces of the inner wall surfaces of the valve body converge towards an interior of the crankcase in an inclination of about 10 to 20 degrees and a maximum lateral width of each of the expanded portions is defined to about 5 to 10 mm.

According to the present invention of the structures described above, when the fuel gas pushes and opens the reed valves and flows into the crankcase due to the negative pressure within the crankcase, much more fuel gas can flow out to the expanded portions from the side edges of the reed valves and can be supplied efficiently due to a suction effect provided by the presence of the expanded portions. Accordingly, by adding to the flow out from the leading ends of the reed valves, the suction efficiency of the fuel gas into the crankcase is enhanced, whereby an engine response becomes better and an engine output is improved throughout the whole revolution range.

Although the location of the expanded portions may result in a lowering of a compression ratio of the interior of the crankcase, the suction efficiency becomes higher due to the flow plane configuration in spite of a little voluminal increase thereof because they are formed in the gentle mountain-shaped configuration with slight angles.

BRIEF DESCRIPTION OF THE DRAWINGS

For a better understanding of the present invention and to show how the same is carried out, reference is made, by way of a preferred embodiment, to the accompanying drawings, in which.

DESCRIPTION OF THE PREFERRED EMBODIMENT

One embodiment of the present invention will be described hereunder with reference to the accompanying drawings.

Figure 1:
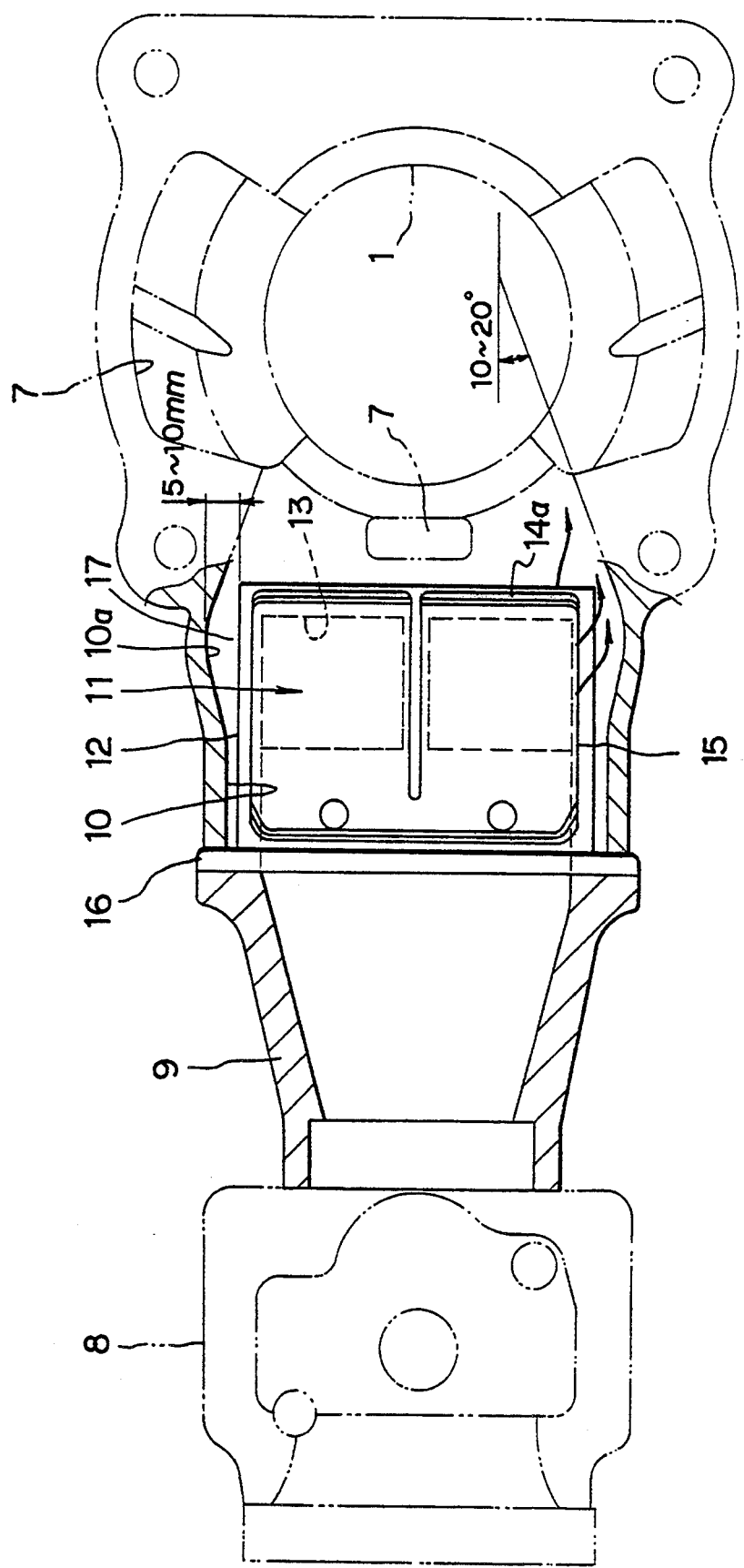
FIG. 1 is a longitudinal sectional view of a two-stroke cycle engine provided with a reed valve assembly according to the present invention.
Figure 2:
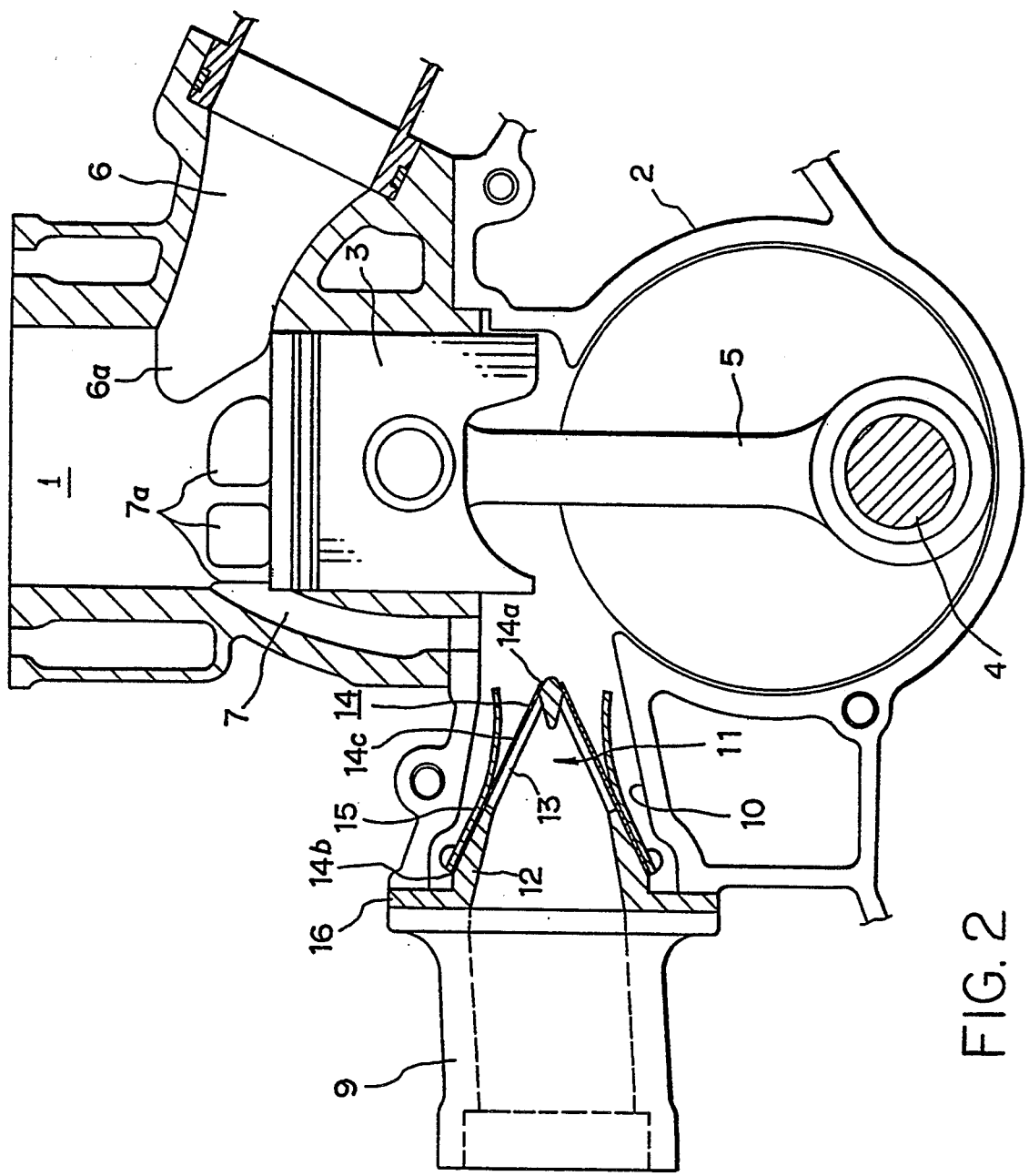
FIG. 2 is an elevational sectional view of the two-stroke cycle engine of FIG. 1.

Referring to FIGS. 1 and 2, a two-stroke cycle engine includes a cylinder assembly 1 and a crankcase 2 connected to the lower portion, as viewed in FIG. 2, of the cylinder assembly 1. A piston 3 accommodated in the cylinder assembly 1 is moved up and down by a revolution of a crankshaft through a crankpin 4 and a connecting rod 5. An exhaust port 6a of an exhaust passage 6 and a scavenging port 7a of a scavenging passage 7 connected to the crankcase 2 in communication with the interior thereof are opened and closed by the up and down displacement of the piston 3.

On the other hand, an intake pipe 9 in communication with a carburetor 8 is connected in communication to the interior of the crankcase 2. A valve chamber 10 is formed in an intake passage of the crankcase 2 at the connecting portion and accommodates a reed valve assembly 11. The opening and closing of the intake passage which communicates from the intake pipe 9 to the crankcase 2 through the valve chamber 10 is controlled by means of the reed valve assembly 11.

The reed valve assembly 11 comprises a box-shaped valve body 12 which has an upper and a lower surface which converge towards the leading end, an opened base end portion and reed valves 14, having a resilient property, resiliently kept in contact with the valve openings 13 formed in the upper and the lower surfaces respectively. Each of the reed valves 14 has a leading end portion 14a as a free end and a base end portion 14b which is fixedly secured to a stopper plate 15. The reed valve assembly 11 assembled in that way is held at a flange portion 16 of the base end portion of the valve body 12 between the connecting portion of the intake pipe 9 and the crankcase 2 with the leading end portion facing the interior of the crankcase 2 so as to -block the valve chamber 10.

Further, the valve chamber 10 has opposite side inner surfaces 10a each of which is formed in a gentle mountain-shaped curved surface which concaves outwardly gradually to thereby form an expanded portion 17 between the curved surface and the side of the valve body 12.

For example, in a preferred design, the maximum width of the expanded portion 17 is 5 to 10 mm and it converges towards the interior of the crankcase 2 at an inclination angle of 10–20 degrees as shown in FIG. 1.

Meantime, when the piston 3 moves up, as viewed in FIG. 2, in the cylinder assembly 1 and then the interior of the crankcase 2 falls into a negative pressure, the fuel gas within the intake pipe 9 is intaken thereinto through the reed valve assembly 11. Thereupon, the fuel gas admitted into the valve body 12 pushes and opens the reed valves 14 and flows into the crankcase 2 from the valve openings 13 through the leading end portions 14a and the opposite side portions 14c of the reed valves 14.

When the piston 3 moves down, the negative pressure changes to a positive pressure. Thereupon, the reed valves 14 are returned due to their resiliency to close the valve openings 13 and the admitted fuel gas is primarily compressed within the crankcase 2.

When examining in detail a condition that the fuel gas pushes and opens the reed valves 14 and flows into the crankcase 2 during the intake stroke, it is confirmed that a large amount of fuel gas flows out of the reed valve side edge portions 14c to the expanded portions 17 due to a suction effect of the negative pressure because the negative pressure within the crankcase 2 is transmitted also to the expanded portions 17.

Therefore, by adding to the flow out from the leading end portions 14a of the reed valves, the suction efficiency for the fuel gas into the crankcase 2 is enhanced, so that an engine response becomes better and an engine output is improved throughout the whole revolution range.

Although the additional location of the expanded portions may result in a lowering of a compression ratio of the interior of the crankcase, the suction efficiency becomes higher due to the flow plane configuration in spite of a little voluminal increase thereof because they are formed in the gentle mountain-shape configuration.

What is claimed is

1. A reed valve assembly comprising:
    a box-shaped valve body having an opened base end, upper and lower surfaces converging toward a front end and each having at least one valve opening, and side surfaces between the upper and lower surfaces;
    reed valves resiliently secured to the body for covering the valve openings; and
    a valve chamber housing the valve body and having inner wall surfaces opposing the side surfaces of the valve body, each inner wall surface having a single, smoothly contoured, outwardly concave arcuate portion, the arcuate portions diverging upstream from the front end of the valve body and converging at and downstream from the front end each with an inclination of about to 20 degrees.

2. A reed valve assembly according to claim 1, further comprising stopper plates each having one end secured to the base end of the valve body.

3. A reed valve assembly according to claim 1, further including an intake pipe disposed between a carburetor and the valve chamber, the base end of the valve body including a flanged portion secured to one end of the intake pipe.

4. A reed valve assembly according to claim 1, wherein a maximum lateral distance between each side surface of the valve body and the corresponding opposed arcuate portion is about 5 to 10 mm.

* * * * *

UNITED STATES PATENT AND TRADEMARK OFFICE
CERTIFICATE OF CORRECTION

PATENT NO. : 5,390,699
DATED : February 21, 1995
INVENTOR(S) : Toshiyuki YAMADA

It is certified that error appears in the above-indentified patent and that said Letters Patent is hereby corrected as shown below:

Claim 1, Column 4, Line 37, after "about" insert --10--.

Signed and Sealed this

Thirteenth Day of June, 1995

Attest:

BRUCE LEHMAN

Attesting Officer     Commissioner of Patents and Trademarks